United States Patent
Lin et al.

(10) Patent No.: US 7,944,666 B2
(45) Date of Patent: May 17, 2011

(54) HOT PLUG ELECTRONIC DEVICE WITH HIGH USING SAFETY AND OVER-THERMAL PROTECTION DEVICE THEREOF

(75) Inventors: Yu-Tong Lin, Hsinchu County (TW); Hsiang-Hsiung Yu, Taipei County (TW)

(73) Assignee: Phison Electronics Corp., Miaoli (TW)

( * ) Notice: Subject to any disclaimer, the term of this patent is extended or adjusted under 35 U.S.C. 154(b) by 260 days.

(21) Appl. No.: 12/210,386

(22) Filed: Sep. 15, 2008

(65) Prior Publication Data
US 2009/0237852 A1  Sep. 24, 2009

(30) Foreign Application Priority Data
Mar. 24, 2008 (TW) .............................. 97110412 A

(51) Int. Cl.
*H02H 5/04* (2006.01)
*G01K 7/00* (2006.01)

(52) U.S. Cl. ...................... 361/103; 374/163; 374/170

(58) Field of Classification Search ................... 361/103
See application file for complete search history.

(56) References Cited

U.S. PATENT DOCUMENTS

| | | | |
|---|---|---|---|
| 2001/0038518 A1* | 11/2001 | Yamaji | 361/93.8 |
| 2004/0070910 A1* | 4/2004 | Gergintschew | 361/103 |

* cited by examiner

*Primary Examiner* — Dharti H Patel
(74) *Attorney, Agent, or Firm* — J.C. Patents

(57) ABSTRACT

A hot plug electronic device with high using safety is provided. The hot plug electronic device includes an operation circuit, a voltage regulator and an over-thermal protection device. The operation circuit is used for communicating with an external host. The voltage regulator is coupled to the operation circuit for supplying power to the operation circuit. The over-thermal protection device is coupled to the voltage regulator for sensing the present temperature of the hot plug electronic device, and accordingly controlling the voltage regulator to normally supply/stop supplying the power to the operation circuit.

13 Claims, 3 Drawing Sheets

HOT PLUG ELECTRONIC DEVICE WITH HIGH USING SAFETY AND OVER-THERMAL PROTECTION DEVICE THEREOF

CROSS-REFERENCE TO RELATED APPLICATION

This application claims the priority benefit of Taiwan application serial no. 97110412, filed on Mar. 24, 2008. The entirety of the above-mentioned patent application is hereby incorporated by reference herein and made a part of specification.

BACKGROUND OF THE INVENTION

1. Field of the Invention

The present invention relates to a hot plug electronic device. More particularly, the present invention relates to a hot plug electronic device with high using safety and an over-thermal protection device thereof.

2. Description of Related Art

Since a flash memory has features of non-volatile, low power consumption, small size and non-mechanical structure etc., it becomes a widely used storage device recently. Accordingly, various electronic products applying the flash memories are developed by different manufactures, in which a USB flash memory pen drive becomes a popular one. Generally, since a present USB flash memory pen drive has a hot plug function; it becomes popular in the market due to the feature of high utilization convenience thereof.

However, an actual utilization situation is that when the USB flash memory pen drive is hot plugged to a personal computer, at the moment of plugging, an excessive power damping of the USB flash memory pen drive may be occurred, or an excessive low voltage signal may be sneaked into the USB flash memory pen drive, which may cause a damage to an electrostatic discharge (ESD) protection device within the USB flash memory pen drive, and the damage situation is either an open circuit damage or a short circuit damage.

Accordingly, if the damage situation of the ESD protection device is the open circuit damage, now the USB flash memory pen drive is susceptible to electrostatic interference and may be damaged accordingly. Moreover, if the damage situation of the ESD protection device is the short circuit damage, a power supply (generally is 3.3V) of the USB flash memory pen drive may be directly guided to a ground level, so that if the USB flash memory pen drive is plugged into the personal computer for a long time, the USB flash memory pen drive may be over-thermal, and a case thereof may be burned. Moreover, a user trying to pull out the burned USB flash memory pen drive may be scalded, and therefore utilization safety of the USB flash memory pen drive is greatly reduced.

SUMMARY OF THE INVENTION

Accordingly, the present invention is directed to an over-thermal protection device, which may prevent burning of a case of a hot plug electronic device when ESD protection devices of the electronic device are damaged.

The present invention is directed to a hot plug electronic device applying the over-thermal protection device provided by the present invention, by which a utilization safety may be greatly improved.

The present invention provides an over-thermal protection device adapted to a hot plug electronic device. The over-thermal protection device includes a temperature sensor and a latch unit. The temperature sensor has a predetermined temperature established therein for sensing a present temperature of the hot plug electronic device, and outputting a normal signal when the present temperature of the hot plug electronic device does not exceed the predetermined temperature, or conversely outputting an over-thermal signal. The latch unit is coupled to the temperature sensor for receiving the normal/over-thermal signal and an initial signal, so as to control a voltage regulator of the hot plug electronic device to normally supply power to an operation circuit of the hot plug electronic device, or to stop supplying the power to the operation circuit.

In an embodiment of the present invention, the latch unit includes an input circuit and a latch circuit. The input circuit is coupled to the temperature sensor for receiving the normal/over-thermal signal and the initial signal, so as to output a power-supply state signal. The latch circuit is coupled to the input circuit for latching and outputting the power-supply state signal, so as to control the voltage regulator to normally supply the power to the operation circuit, or stop supplying the power to the operation circuit.

According to another aspect, the present invention provides a hot plug electronic device with high using safety. The hot plug electronic includes an operation circuit, a voltage regulator and an over-thermal protection device. The operation circuit is used for communicating with an external host. The voltage regulator is coupled to the operation circuit for supplying power to the operation circuit. The over-thermal protection device is coupled to the voltage regulator for sensing a present temperature of the hot plug electronic device, and accordingly controlling the voltage regulator to normally supply/stop supplying the power to the operation circuit.

In an embodiment of the present invention, the voltage regulator includes an operational amplifier, a switch, a power transistor, a first resistor and a second resistor. An inverting input terminal of the operational amplifier receives a reference voltage. One terminal of the switch is coupled to a system voltage, and another terminal of the switch is coupled to an output terminal of the operational amplifier. A gate of the power transistor is coupled to the output terminal of the operational amplifier, and a source of the power transistor is coupled to the system voltage. One terminal of the first resistor is coupled to a drain of the power transistor, and another terminal of the first resistor is coupled to a non-inverting input terminal of the operational amplifier. One terminal of the second resistor is coupled to the non-inverting input terminal of the operational amplifier, and another terminal of the second resistor is coupled to a ground level.

In an embodiment of the present invention, the over-thermal protection device includes a temperature sensor and a latch unit. The temperature sensor has a predetermined temperature established therein for sensing a present temperature of the hot plug electronic device, and outputting a normal signal when the present temperature of the hot plug electronic device does not exceed the predetermined temperature, or conversely outputting an over-thermal signal. The latch unit is coupled to the temperature sensor for receiving the normal/over-thermal signal and an initial signal, so as to control the voltage regulator to normally supply the power to the operation circuit, or stop supplying the power to the operation circuit.

In an embodiment of the present invention, the latch unit includes an input circuit and a latch circuit. The input circuit is coupled to the temperature sensor for receiving the normal/over-thermal signal and the initial signal, so as to output a power-supply state signal. The latch circuit is coupled to the input circuit for latching and outputting the power-supply state signal, so as to control whether the switch within the voltage regulator is conducted or not for determining whether or not the voltage regulator normally supplies power to the operation circuit, or stops supplying the power to the operation circuit. Wherein, when the switch within the voltage regulator is cut off, the voltage regulator normally supplies the power to the operation circuit, and when the switch within the voltage regulator is conducted, the voltage regulator stops supplying the power to the operation circuit.

In the aforementioned embodiment, the input circuit includes a first transistor and a second transistor. A gate of the first transistor receives the initial signal, and a source of the first transistor is coupled to the ground level. A gate of the second transistor receives the normal/over-thermal signal, a source of the second transistor is coupled to the system voltage, and a drain of the second transistor is coupled to a drain of the first transistor for outputting the power-supply state signal.

In the aforementioned embodiment, the latch circuit includes a first inverter, a second inverter and a third inverter. An input terminal of the first inverter is coupled to the drain of the second transistor. An input terminal of the second inverter is coupled to an output terminal of the first inverter, and an output terminal of the second inverter is coupled to the drain of the second transistor. An input terminal of the third inverter is coupled to the output terminal of the first inverter, and an output terminal of the third inverter is used for outputting the latched power-supply state signal.

In the aforementioned embodiment, the first transistor is an NMOS transistor, the second transistor is a PMOS transistor, and the power transistor is a PMOS power transistor.

In the aforementioned embodiment, the hot plug electronic device includes at least one of a USB hot plug electronic device, a SATA hot plug electronic device and a PCIE hot plug electronic device.

Based on the over-thermal protection device provided by the present invention, when the ESD protection devices of the hot plug electronic device are short-circuited, the power supplied to the internal operation circuit of the hot plug electronic device by the voltage regulator is turned off, so that the power supply of the hot plug electronic device cannot be directly guided to the ground level, and accordingly burning of the case of the hot plug electronic device may be avoided. Moreover, since the over-thermal protection device provided by the present invention is applied to the hot plug electronic device, using safety thereof is greatly improved.

In order to make the aforementioned and other objects, features and advantages of the present invention comprehensible, a preferred embodiment accompanied with figures is described in detail below.

DESCRIPTION OF EMBODIMENTS

Technique functions to be achieved by the present invention are to prevent burning of a case of a hot plug electronic device to scald a user, and to improve a using safety of the hog plug electronic device. In the following content, technique features and technique functions to be achieved by the present invention are described in detail for those skilled in the art.

Figure 1:
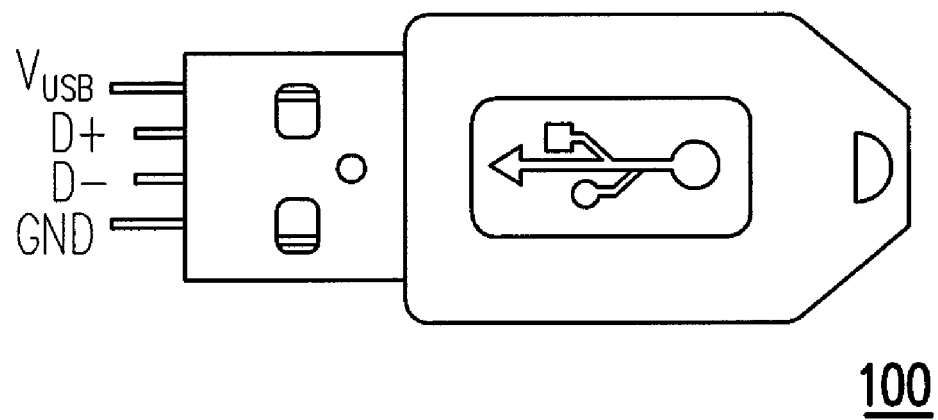
FIG. 1 is a schematic diagram of a hot plug electronic device according to an embodiment of the present invention.
Figure 2:
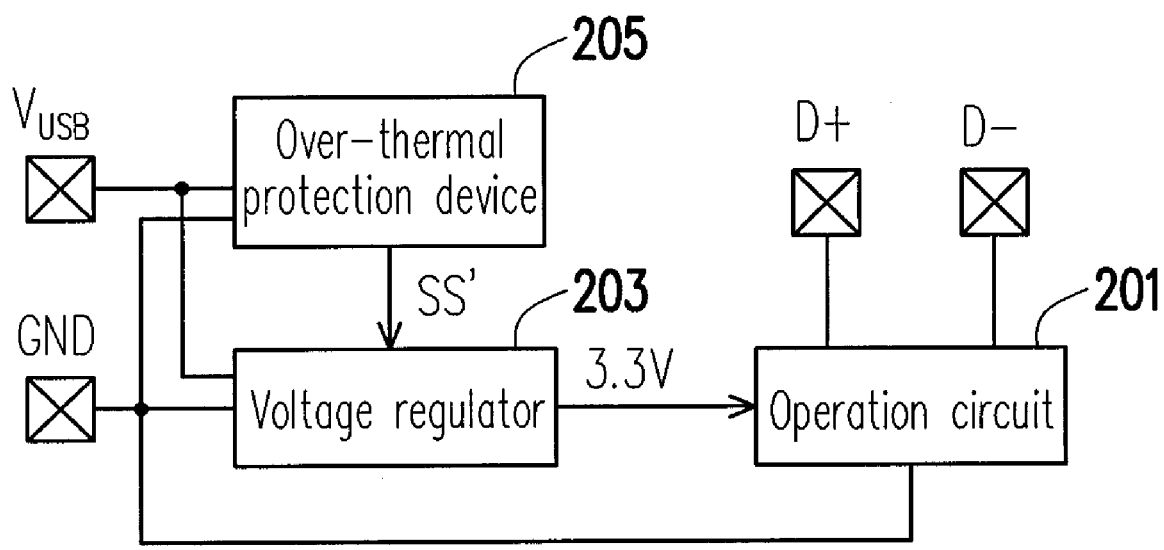
FIG. 2 is a system block diagram of a hot plug electronic device according to an embodiment of the present invention.

FIG. 1 is a schematic diagram of a hot plug electronic device 100 according to an embodiment of the present invention. FIG. 2 is a system block diagram of a hot plug electronic device 100 according to an embodiment of the present invention. It should be noted that to fully convey the spirit of the present invention, the hot plug electronic device 100 first takes a USB hot plug electronic device (for example, a USB flash memory pen drive) as an example. Though, the present invention is not limited thereto, and detailed descriptions thereof will be explained in the following content.

First, referring to FIG. 1, the USB hot plug electronic device 100 includes four pins connecting to an external host (such as a personal computer, not shown). The four pins include a power pin $V_{USB}$, a ground pin GND, and two data transmission pins D+ and D−. The USB hot plug electronic device 100 respectively receives a 5V system voltage and a ground level (0V) supplied by a power supply of the personal computer via the power pin $V_{USB}$ and the ground pin GND, and communicates to the personal computer via the data transmission pins D+ and D−. However, such techniques are already known by those skilled in the art, and therefore detailed description thereof will not be repeated.

Next, referring to FIG. 2, besides the four pins $V_{USB}$, GND, D+ and D−, the USB hot plug electronic device 100 further includes an operation circuit 201, a voltage regulator 203 and an over-thermal protection device 205. The operation circuit 201 may communicate with the external host (such as the personal computer, though the present invention is not limited thereto) via the data transmission pins D+ and D−. The voltage regulator 203 is coupled to the operation circuit 201, and may firstly receive the 5V system voltage and the 0V ground level via the power pin $V_{USB}$ and the ground pin GND, and then regulates the 5V system voltage into 3.3V and supplies it to the operation circuit 201.

The over-thermal protection device 205 is coupled to the voltage regulator 203 for sensing a present temperature of the USB hot plug electronic device 100, and accordingly controlling the voltage regulator 203 to normally supply the power to the operation circuit 201, or stop supplying the power to the operation circuit 201. To fully convey the spirit of the present invention to those skilled in the art, circuit diagrams of the operation circuit 201, the voltage regulator 203 and the over-thermal protection device 205 are provided and described in detail for those skilled in the art.

Figure 3:
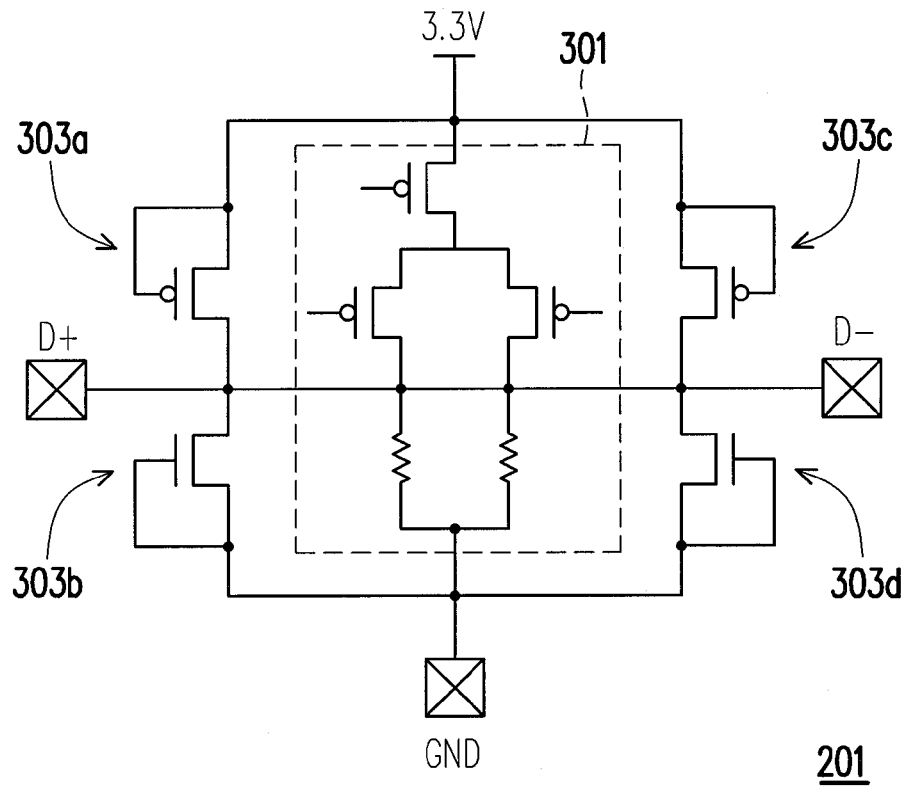
FIG. 3 is a circuit diagram illustrating an operation circuit according to an embodiment of the present invention.

FIG. 3 is a circuit diagram illustrating an operation circuit 201 according to an embodiment of the present invention. Referring to FIG. 1 through FIG. 3, the operation circuit 201 includes an internal operation circuit 301 and four ESD protection devices 303a~303d. The internal operation circuit 301 communicates with the external host (such as the personal computer) via the data transmission pins D+ and D−. The ESD protection devices 303a~303d are used for dealing with an electrostatic damage or the electrostatic discharge. However, operations and functions of the internal operation circuit 301 and the ESD protection devices 303a~303d are known by those skilled in the art, and therefore detailed descriptions thereof will not be repeated.

Figure 4:
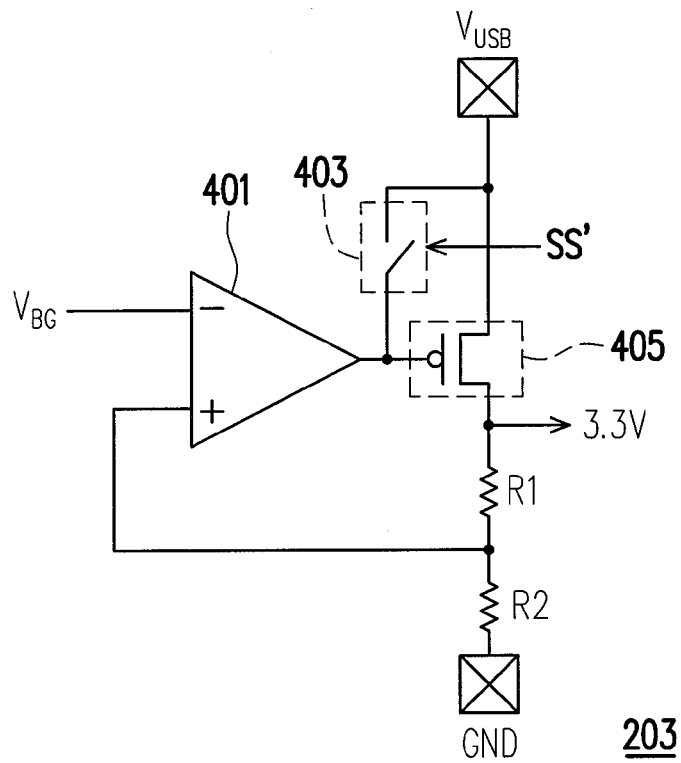
FIG. 4 is a circuit diagram illustrating a voltage regulator according to an embodiment of the present invention.

FIG. 4 is a circuit diagram illustrating a voltage regulator 203 according to an embodiment of the present invention. Referring to FIG. 1 through FIG. 4, the voltage regulator 203 respectively receives the 5V system voltage and the ground level via the power pin $V_{USB}$ and the ground pin GND. The voltage regulator 203 includes an operational amplifier 401, a switch 403, a power transistor 405 (which is a PMOS power transistor in the present embodiment), a first resistor R1 and a second resistor R2. Wherein, an inverting input terminal (−) of the operational amplifier 401 receives a reference voltage $V_{BG}$ supplied by, for example, a bandgap (not shown).

One terminal of the switch 403 is coupled to the system voltage (i.e. the 5V system voltage) and a source of the power transistor 405, and another terminal of the switch 403 is coupled to an output terminal of the operational amplifier 401 and a gate of the power transistor 405. A drain of the power transistor is coupled to one terminal of the first resistor R1, and another terminal of the resistor R1 is coupled to a non-inverting input terminal (+) of the operational amplifier 401 and one terminal of the second resistor R2. Another terminal of the second resistor R2 is coupled to the ground level.

Figure 5:
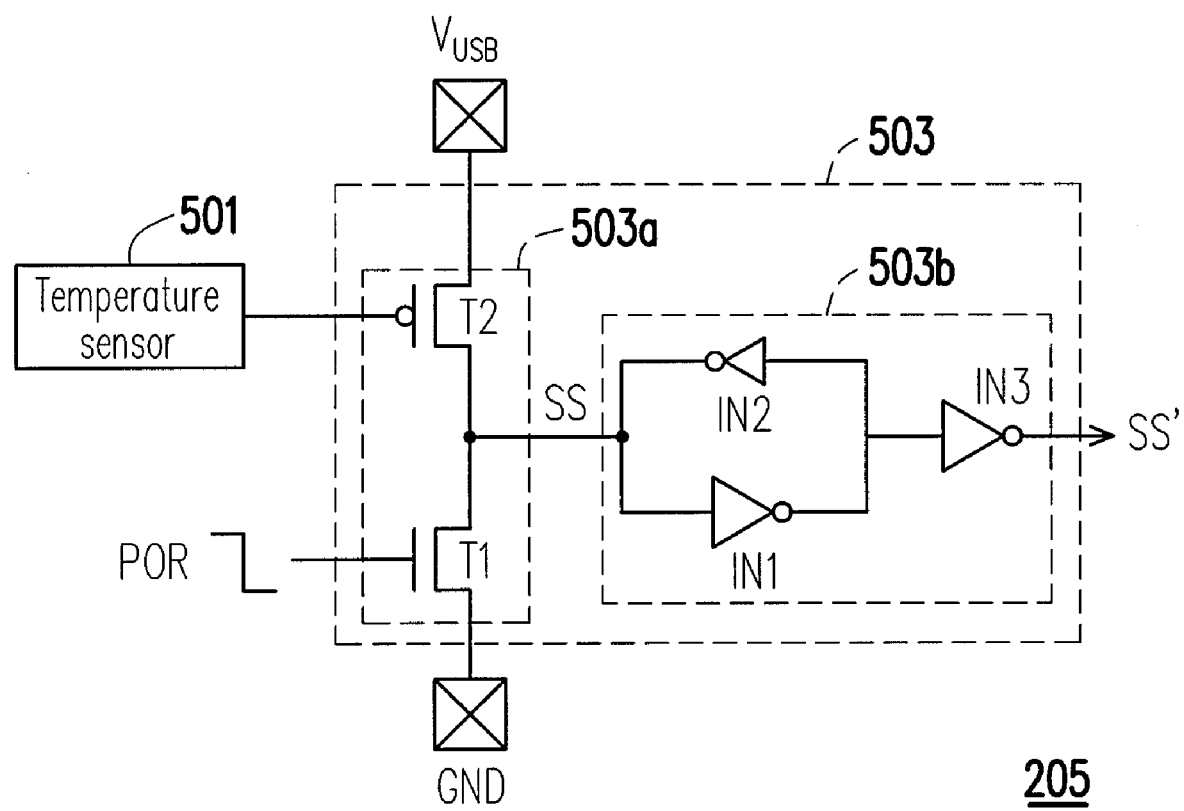
FIG. 5 is a circuit diagram illustrating an over-thermal protection device according to an embodiment of the present invention.

FIG. 5 is a circuit diagram illustrating an over-thermal protection device 205 according to an embodiment of the present invention. Referring to FIG. 1 through FIG. 5, the over-thermal protection device 205 also receives the 5V system voltage and the ground level via the power pin $V_{USB}$ and the ground pin GND. The over-thermal protection device 205 includes a temperature sensor 501 and a latch unit 503. Wherein, the temperature sensor 501 has a predetermined temperature established therein (which is assumed to be 160° C. in the present embodiment, though such temperature may be varied according to an actual design requirement) for sensing the present temperature of the USB hot plug electronic device 100, and outputting a normal signal N when the present temperature of the USB hot plug electronic device 100 does not exceed the predetermined temperature, or conversely outputting an over-thermal signal H.

It should be noted that since the voltage regulator 203 may regulate the received 5V system voltage into 3.3V and provide it to the operation circuit 201, so that the power transistor 405 of the voltage regulator 203 is then a device with the highest temperature within the USB hot plug electronic device 100. Therefore, to achieve an optimal function of the over-thermal protection device 205, the temperature sensor 501 is designed to be located nearest to the power transistor 405 in the present embodiment.

The latch unit 503 is coupled to the temperature sensor 501 for receiving the normal signal N or the over-thermal signal H and an initial signal POR (for example, a power-on reset signal), and accordingly controlling the voltage regulator 203 to normally supply the power to the operation circuit 201, or stop supplying the power to the operation circuit 201.

In the present embodiment, the latch unit 503 includes an input circuit 503a and a latch circuit 503b. Wherein, the input circuit 503a is coupled to the temperature sensor 501 for receiving the normal signal N or the over-thermal signal H and the initial signal POR, and accordingly outputting a power-supply state signal SS. The latch circuit 503b is coupled to the input circuit 503a for latching and outputting the power-supply state signal SS outputted from the input circuit 503a, and accordingly controlling whether the switch 403 within the voltage regulator 203 is conducted or not, so as to determine whether or not the voltage regulator 203 normally supplies the power to the operation circuit 201, or stops supplying the power to the operation circuit 201.

Moreover, the input circuit 503a includes a first transistor T1 (which is an NMOS transistor in the present embodiment) and a second transistor T2 (which is a PMOS transistor in the present embodiment). Wherein, a gate of the first transistor T1 receives the initial signal POR, and a source of the first transistor T1 is coupled to the ground level (0V). A gate of the second transistor T2 receives the normal signal N or the over-thermal signal H outputted from the temperature sensor 501, a source of the second transistor T2 is coupled to the system voltage (i.e. the 5V system voltage), and a drain of the second transistor T2 is coupled to a drain of the first transistor T1 for outputting the power-supply state signal SS.

Furthermore, the latch circuit 503b includes a first inverter IN1, a second inverter IN2 and a third inverter IN3. An input terminal of the first inverter IN1 is coupled to the drain of the second transistor T2 and an output terminal of the second inverter IN2, an output terminal of the first inverter IN1 is coupled to input terminals of the second inverter IN2 and the third inverter IN3, and an output terminal of the third inverter IN3 is used for outputting a latched power-supply state signal SS'.

Referring to FIG. 1 through FIG. 5, here, assuming the ESD protection devices 303a~303d of the operation circuit 201 are all in good conditions (i.e. not damaged). When the USB hot plug electronic device 100 is plugged into the personal computer, since the initial signal POR may firstly be transformed from a high voltage level to a low voltage level, the first transistor T1 of the input circuit 503a may be conducted when the initial signal POR has the high voltage level. In addition, since the present temperature of the USB hot plug electronic device 100 now sensed by the temperature sensor 501 is sure less than the predetermined temperature (i.e. 160° C.), the temperature sensor 501 then outputs the normal signal N with the high voltage level, so that the second transistor T2 of the input circuit 503a is in a cut off state. Consequently, the input circuit 503a then outputs the power-supply state signal SS with the low voltage level to the latch circuit 503b.

Next, the latch circuit 503b latches the received power-supply state signal SS with the low voltage level, and outputs the latched power-supply state signal SS' to the voltage regulator 203, so as to maintain the switch 403 of the voltage regulator 203 in the cut off state. In this case, the voltage regulator 203 then may normally supply the power (i.e. 3.3V) to the operation circuit 201, so that the operation circuit 201 may communicate with the personal computer via the data transmission pins D+ and D−.

However, during plugging or operation of the USB hot plug electronic device 100, if the ESD protection devices 303a~303d of the operation circuit 201 are damaged (assumed to be short circuited), since the power supply (i.e. 3.3V) of the operation circuit 201 is now directly guided to the ground level (0V), after a duration, a temperature of the power transistor 403 sensed by the temperature sensor 501 may sure exceed the predetermined temperature (i.e. 160° C.), and therefore the temperature sensor 501 then outputs the over-thermal signal H with the low voltage level, so as to conduct the second transistor T2 of the input circuit 503a. Consequently, the input circuit 503a then outputs the power-supply state signal SS with the high voltage level to the latch circuit 503b.

Next, the latch circuit 503b latches the power-supply state signal SS with the high voltage level, and outputs the latched power-supply state signal SS' to the voltage regulator 203, so as to maintain the switch 403 of the voltage regulator 203 in the conducted state. In this case, the voltage regulator 203 then stops supplying the power (i.e. 3.3V) to the operation circuit 201, and the power supply of the operation circuit 201 will not be directly guided to the ground level, and therefore burning of the case of the USB hot plug electronic device 100 may be avoided.

It should be noted that since the initial signal POR only has the high voltage level in an initial stage when the USB hot plug electronic device is plugged into the personal computer, and therefore once the switch 403 of the voltage regulator 203 is conducted, the state of the power-supply state signal SS received by the latch circuit 503b is then maintained unchanged (i.e. maintained to be the high voltage level), so that the switch 403 of the voltage regulator 203 may be maintained in the conducted state, and the voltage regulator 203 is not maintained to supply the power to the operation circuit 201, unless the USB hot plug electronic device 100 is re-plugged.

According to the aforementioned descriptions, even if the ESD protection devices 303a~303d of the USB hot plug electronic device 100 are short circuited, burning of the case of the USB hot plug electronic device 100 due to over-thermal thereof may still be avoided, and accordingly the problem of scalding the user of the conventional technique may be solved.

However, the spirit of the present invention is not limited to the aforementioned embodiments. More clearly, as long as any type of a hot plug electronic device such as a SATA hot plug electronic device or a PCIE hot plug electronic device has the power pin, the ground pin and the data transmission pins, the over-thermal protection device 205 of the present embodiment may be applied thereto to prevent the burning situation, and these devices are all within the scope of the present invention.

In summary, based on the over-thermal protection device provided by the present invention, when the ESD protection devices of the hot plug electronic device are short-circuited, the power supplied to the internal operation circuit of the hot plug electronic device by the voltage regulator is turned off, so that the power supply of the hot plug electronic device cannot be directly guided to the ground level, and accordingly burning of the case of the hot plug electronic device may be avoided. Moreover, since the over-thermal protection device provided by the present invention is applied to the hot plug electronic device, using safety thereof is greatly improved, and the problem of scalding the user is avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An over-thermal protection device, adapted to a hot plug electronic device, the over-thermal protection device comprising:
    a temperature sensor, having a predetermined temperature established therein, for sensing a present temperature of the hot plug electronic device, and outputting a normal signal when the present temperature does not exceed the predetermined temperature, and conversely outputting an over-thermal signal; and
    a latch unit, coupled to the temperature sensor, for receiving the normal/over-thermal signal and an initial signal, and accordingly controlling a voltage regulator of the hot plug electronic device to normally supply power to an operation circuit of the hot plug electronic device, or stop supplying the power to the operation circuit,
    wherein the hot plug electronic device comprises at least one of a USB (Universal Serial Bus) hot plug electronic device, a SATA (Serial Advanced Technology Attachment hot plug electronic device and a PCIE (Peripheral Component Interconnect Express) hot plug electronic device.

2. The over-thermal protection device as claimed in claim 1, wherein the latch unit comprises:
    an input circuit, coupled to the temperature sensor, for receiving the normal/over-thermal signal and the initial signal, and accordingly outputting a power-supply state signal; and
    a latch circuit, coupled to the input circuit, for latching and outputting the power-supply state signal, and accordingly controlling the voltage regulator to normally supply the power to the operation circuit, or stop supplying the power to the operation circuit.

3. The over-thermal protection device as claimed in claim 2, wherein the input circuit comprises:
    a first transistor, wherein a gate of the first transistor is used for receiving the initial signal, and a source of the first transistor is coupled to a ground level; and
    a second transistor, wherein a gate of the second transistor is used for receiving the normal/over-thermal signal, a source of the second transistor is coupled to a system voltage, and a drain of the second transistor is coupled to a drain of the first transistor for outputting the power-supply state signal.

4. The over-thermal protection device as claimed in claim 3, wherein the latch circuit comprises:
    a first inverter, wherein an input terminal of the first inverter is coupled to the drain of the second transistor;
    a second inverter, wherein an input terminal of the second inverter is coupled to an output terminal of the first inverter, and an output terminal of the second inverter is coupled to the drain of the second transistor; and
    a third inverter, wherein an input terminal of the third inverter is coupled to the output terminal of the first inverter, and an output terminal of the third inverter is used for outputting a latched power-supply state signal.

5. The over-thermal protection device as claimed in claim 3, wherein the first transistor is an NMOS transistor, and the second transistor is a PMOS transistor.

6. A hot plug electronic device with high using safety, comprising:
    an operation circuit, for communicating with an external host;
    a voltage regulator, coupled to the operation circuit, for supplying power to the operation circuit; and
    an over-thermal protection device, coupled to the voltage regulator, for sensing a present temperature of the hot plug electronic device so as to obtain a normal signal or an over-thermal signal, and controlling the voltage regulator to normally supply the power to the operation circuit, or stop supplying the power to the operation circuit according to the normal/over-thermal signal and an initial signal,
    wherein the hot plug electronic device comprises at least one of a USB (Universal Serial Bus) hot plug electronic device, a SATA (Serial Advanced Technology Attachment hot plug electronic device and a PCIE (Peripheral Component Interconnect Express) hot plug electronic device.

7. The hot plug electronic device with high using safety as claimed in claim 6, wherein the voltage regulator comprises:
    an operational amplifier, wherein an inverting input terminal of the operational amplifier is used for receiving a reference voltage;
    a switch, wherein one terminal of the switch is coupled to a system voltage, and another terminal of the switch is coupled to an output terminal of the operational amplifier;

a power transistor, wherein a gate of the power transistor is coupled to the output terminal of the operational amplifier, and a source of the power transistor is coupled to the system voltage;

a first resistor, wherein one terminal of the first resistor is coupled to a drain of the power transistor, and another terminal of the first resistor is coupled to a non-inverting input terminal of the operational amplifier; and a second resistor, wherein one terminal of the second resistor is coupled to the non-inverting input terminal of the operational amplifier, and another terminal of the second resistor is coupled to a ground level.

8. The hot plug electronic device with high using safety as claimed in claim 7, wherein the power transistor is a PMOS power transistor.

9. The hot plug electronic device with high using safety as claimed in claim 7, wherein the over-thermal protection device comprises:

a temperature sensor, having a predetermined temperature established therein, for sensing the present temperature of the hot plug electronic device, and outputting the normal signal when the present temperature does not exceed the predetermined temperature, and conversely outputting the over-thermal signal; and a latch unit, coupled to the temperature sensor, for receiving the normal/over-thermal signal and the initial signal, and accordingly controlling the voltage regulator to normally supply the power to the operation circuit, or stop supplying the power to the operation circuit.

10. The hot plug electronic device with high using safety as claimed in claim 9, wherein the latch unit comprises:

an input circuit, coupled to the temperature sensor, for receiving the normal/over-thermal signal and the initial signal, and accordingly outputting a power-supply state signal; and a latch circuit, coupled to the input circuit, for latching and outputting the power-supply state signal, and accordingly controlling whether the switch is conducted or not, so as to determine whether or not the voltage regulator normally supplies the power to the operation circuit, or stops supplying the power to the operation circuit, wherein when the switch is cut off, the voltage regulator normally supplies the power to the operation circuit, and when the switch is conducted, the voltage regulator stops supplying the power to the operation circuit.

11. The hot plug electronic device with high using safety as claimed in claim 10, wherein the input circuit comprises:

a first transistor, wherein a gate of the first transistor is used for receiving the initial signal, and a source of the first transistor is coupled to the ground level; and a second transistor, wherein a gate of the second transistor is used for receiving the normal/over-thermal signal, a source of the second transistor is coupled to the system voltage, and a drain of the second transistor is coupled to a drain of the first transistor for outputting the power-supply state signal.

12. The hot plug electronic device with high using safety as claimed in claim 11, wherein the latch circuit comprises:

a first inverter, wherein an input terminal of the first inverter is coupled to the drain of the second transistor;

a second inverter, wherein an input terminal of the second inverter is coupled to an output terminal of the first inverter, and an output terminal of the second inverter is coupled to the drain of the second transistor; and a third inverter, wherein an input terminal of the third inverter is coupled to the output terminal of the first inverter, and an output terminal of the third inverter is used for outputting a latched power-supply state signal to determine whether the switch is conducted or not.

13. The hot plug electronic device with high using safety as claimed in claim 11, wherein the first transistor is an NMOS transistor, and the second transistor is a PMOS transistor.

* * * * *